United States Patent
Dittmer et al.

(10) Patent No.: US 12,165,485 B2
(45) Date of Patent: Dec. 10, 2024

(54) LIGHT GUIDING ARRANGEMENT, SPARK AND/OR FLAME DETECTOR AND FIRE PROTECTION SYSTEM

(71) Applicant: Minimax Viking Patent Management Gmbh, Bad Oldesloe (DE)

(72) Inventors: Hauke Dittmer, Fehmarn (DE); Dirk Siemer, Rethwisch (DE); Bernd Ziems, Zarpen (DE)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 304 days.

(21) Appl. No.: 17/612,861

(22) PCT Filed: May 28, 2020

(86) PCT No.: PCT/EP2020/064818
§ 371 (c)(1),
(2) Date: Nov. 19, 2021

(87) PCT Pub. No.: WO2020/239898
PCT Pub. Date: Dec. 3, 2020

(65) Prior Publication Data
US 2022/0319291 A1 Oct. 6, 2022

(30) Foreign Application Priority Data
May 28, 2019 (DE) ...................... 10 2019 114 274.1

(51) Int. Cl.
*G01J 5/00* (2022.01)
*G01J 5/02* (2022.01)
(Continued)

(52) U.S. Cl.
CPC ............ *G08B 17/12* (2013.01); *G01J 5/0018* (2013.01); *G01J 5/0066* (2013.01); *G01J 5/0205* (2013.01);
(Continued)

(58) Field of Classification Search
CPC ...... G08B 17/12; G01J 5/0018; G01J 5/0066; G01J 5/0205; G01J 5/041; G01J 5/0818;
(Continued)

(56) References Cited

U.S. PATENT DOCUMENTS 5,061,026 A 10/1991 Clarke
2005/0030840 A1* 2/2005 Hagood ................. G02B 6/022
369/44.14
(Continued)

FOREIGN PATENT DOCUMENTS

CN 1112026 11/1995
DE 3042399 6/1982
(Continued)

OTHER PUBLICATIONS

International Search Report, International Application No. PCT/EP2020/064818 (published under WO 2020/239898), 8 pages, Oct. 28, 2020.

*Primary Examiner* — Michelle R Connelly
(74) *Attorney, Agent, or Firm* — Perkins Coie LLP

(57) ABSTRACT

The present invention relates to a light guiding arrangement (1) for transmitting electromagnetic radiation, in particular ultraviolet and/or infrared radiation, and a spark and/or flame detector that uses same. The light guiding arrangement (1) comprises a housing (10) and a light guiding rod (20), wherein the housing (10) has a light entrance opening (12) and a light exit opening (14) situated opposite, wherein the light guiding rod (20) is arranged in the housing (10) between the light entrance opening (12) and the light exit opening (14), wherein the light guiding rod (20) is mounted resiliently on at least one side in the housing (10).

19 Claims, 4 Drawing Sheets

(51) Int. Cl.
*G01J 5/04* (2006.01)
*G01J 5/0818* (2022.01)
*G01J 5/0875* (2022.01)
*G02B 6/10* (2006.01)
*G02B 6/36* (2006.01)
*G02B 6/42* (2006.01)
*G08B 17/12* (2006.01)

(52) U.S. Cl.
CPC .............. *G01J 5/041* (2013.01); *G01J 5/0818* (2013.01); *G01J 5/0875* (2013.01); *G02B 6/102* (2013.01); *G02B 6/4298* (2013.01); G02B 6/3624 (2013.01); G02B 6/4296 (2013.01)

(58) Field of Classification Search
CPC ..... G01J 5/0875; G02B 6/102; G02B 6/4298; G02B 6/3624; G02B 6/4296
See application file for complete search history.

(56) References Cited

U.S. PATENT DOCUMENTS

2007/0223000 A1 9/2007 Gahan
2014/0202253 A1* 7/2014 Harpin .................. G01D 5/268
374/161
2018/0348021 A1 12/2018 Ziems

FOREIGN PATENT DOCUMENTS

| DE | 3042454 | 6/1982 |
| DE | 69124165 T | 4/1997 |
| DE | 60213083 T | 7/2007 |
| DE | 202013006142 U | 9/2013 |
| DE | 102015223362 | 6/2017 |
| JP | 10106317 | 4/1998 |

\* cited by examiner

LIGHT GUIDING ARRANGEMENT, SPARK AND/OR FLAME DETECTOR AND FIRE PROTECTION SYSTEM

PRIORITY CLAIM AND INCORPORATION BY REFERENCE

This application is a 35 U.S.C. § 371 application of International Application No. PCT/EP2020/064818, filed May 28, 2020, which claims the benefit of German Application No. 10 2019 114 274.1 filed May 28, 2019, each of which is incorporated by reference in its entirety.

TECHNICAL FIELD

The present invention relates to a light guiding arrangement for transmitting electromagnetic radiation, to a spark and/or flame detector, to a fire protection system, and to an associated method.

BACKGROUND AND SUMMARY OF THE INVENTION

Spark and flame detectors are known. They are also referred to as spark alarms or flame alarms and are often used in fire protection systems that detect sparks and/or flames and, upon detection, preferably control a device discharging extinguishing agent and/or a protection apparatus via a central control unit. A known possibility of detecting sparks or flames is to detect characteristic electromagnetic radiation generated thereby. The radiation emitted by sparks has characteristic wavelengths in the range from about 0.2 to 2 micrometers, that emitted by flames has a plurality of wavelengths in the range from 0.2 to 6 micrometers. Embers that exhibit a characteristic radiation of sparks and/or flames are also referred to below as sparks.

The problem is that the regions of application to be monitored, in which the sparks or flames are intended to be monitored, are often exposed to very high temperatures of, for example, 450° C., which is outside the operating temperature range of typical detectors, which typically goes up to the range of at most 125° C.

Exemplary regions of application for the use of spark and/or flame detectors and of fire protection systems that offer such challenging environmental influences are pneumatic conveyors in material dryers for e.g. grain or wood chips, where foreign particles such as stones could trigger sparks. Of course, other comparable regions of application are also conceivable, such as e.g. drying chambers/furnaces in which materials could start to burn or other manufacturing processes or objects or spaces in which sparks, embers or flames can occur. In this context, spark and/or flame detectors are also referred to synonymously as spark and/or flame alarms.

The German Patent and Trademark Office researched the following prior art in the priority application for the present application: DE 30 42 399 A1, DE 30 42 454 A1, DE 20 2013 006 142 U1, DE 691 24 165 T2, and U.S. Pat. No. 4,592,353 A.

Against this background, it was an object to provide a light guiding arrangement, a spark and/or flame detector, and also fire protection systems and associated methods that make it possible for sparks or flames that occur in challenging environmental influences to be detectable with a high degree of reliability.

According to the invention, the object is achieved by a light guiding arrangement for transmitting electromagnetic radiation, in particular ultraviolet and/or infrared radiation, wherein the light guiding arrangement has a housing and a light guiding rod, wherein the housing has a light entrance opening and an opposite light exit opening, wherein the light guiding rod is arranged in the housing between the light entrance opening and the light exit opening, wherein the light guiding rod is resiliently mounted on at least one side in the housing.

Thus, a light guiding arrangement that comprises a resiliently mounted light guiding rod is provided, with the result that impacts and varying thermal expansion of the light guiding rod and the housing are allowed. As a result, operation can be ensured even at significantly different temperatures between the light entrance opening and the light exit opening, without stresses occurring in the light guiding arrangement. The light guide is typically fragile and is protected by the spring-loaded mounting according to the invention.

Spring-loaded or floating mounting is particularly advantageous because the refractive index of the light guide, were it to come into contact with the housing, would change, in particular at a cylindrical surface of the light guide, and light guidance would be impaired.

One side of the housing denotes a section of the housing which is arranged at any point and of any shape, such as a surface of the housing. For example, in the case of a cylindrical housing, the sides include both the end faces and the lateral surfaces. In this case, the resilient mounting can thus be realized in the axial and/or radial direction of the cylindrical housing. Alternatives, such as a rectangular housing shape, are conceivable.

The light guide is preferably at least in part made reflective. For example, if the light guide is cylindrical, it is made reflective on its cylindrical surface. This can reduce the effects of any contact between the light guide and the housing.

The light guiding rod is preferably rigid and has a diameter of at least 5 mm. The diameter of the light guiding rod is preferably at most 25 mm. The light guiding rod is preferably cylindrical, wherein the light guiding rod has top and bottom surfaces that face the light entrance opening and the light exit opening, respectively.

The light guiding rod ensures decoupling, in particular thermal decoupling, between the side of the light entrance opening and the light exit opening.

The side of the housing with the light entrance opening is preferably arranged in a protection region to be monitored, which is also referred to as a space and/or a monitoring region, with ambient temperatures of over 80° C., with particular preference of over 125° C.

The length of the light guiding rod is preferably between 75 mm and 1500 mm, wherein the length is particularly preferably selected on the basis of the required or desired temperature difference between the monitoring region adjacent to the light entrance opening and an operating region of a sensor arranged at the light exit opening. Reliable operation of a spark or flame alarm is thus possible; in particular, observance of the operating temperature range below the specified limit value for the sensor and/or the electronic system of the spark and/or flame alarm is ensured.

The use of a light guiding rod instead of a simple light guide, for example an arrangement of glass fibers such as a glass fiber bundle, allows a sensor, which can be arranged in the region of the light exit opening, to have as wide a field of view as possible on the side of the light entrance opening. For this purpose, the entire sensor surface is preferably arrangeable on a top surface of the light guide.

The resilient mounting is preferably designed as mounting in the axial direction of the light guiding rod on the side opposite the light entrance opening.

Due to the length, in particular the expansion in the axial direction is significant and absorbed by the resilient mounting.

An air gap is preferably provided between the light guiding rod and the housing, in particular along the axial direction of the light guiding rod, wherein the air gap is particularly preferably between 0.2 mm and 5 mm. In particular, the air gap is provided circumferentially around the entire light guiding rod. The air in the air gap supports the cooling of the light guiding arrangement.

Particularly preferably, the light guiding arrangement also has an air inlet device, which is set up to introduce air, in particular compressed air, into the air gap between the light guiding rod and the housing. Alternatively, the air in the air gap can flow out on the basis of the heating, or the air gap may have a sealed design. In a further embodiment, negative pressure can prevail in the air gap, which reduces the heat transfer from the housing to the light guiding rod.

The light guiding arrangement preferably furthermore has a protection optical unit arranged in front of the light guiding rod at the light entrance opening.

The surface of the protection optical unit facing the protection region to be monitored forms the plane of entry of the electromagnetic radiation and forms the detection location of the electromagnetic radiation characteristic of sparks and/or flames.

The protection optical unit prevents particles or other objects located in the space facing the light entrance opening from damaging the light guiding rod.

The housing preferably has a thread in the region of the light entrance opening, and the protection optical unit is embodied to be screwed onto the housing.

As a result, the durability of the light guiding arrangement can be improved, since the protection optical unit can be maintained with simple means, for example in the event of contamination, without the need to replace the entire light guiding arrangement. Furthermore, the thread preferably enables the contact pressure to be adapted to the resilient mounting.

The housing preferably has a fixing element for the protection optical unit in the region of the light entrance opening. The fixing element is formed in particular in the form of beading, wherein other suitable fixing elements are also conceivable.

Alternatively or additionally, the light guiding arrangement preferably has elastic mounting in the radial direction around the light guiding rod.

The beading or another suitable fixing element of the housing for the protection optical unit preferably makes possible a fixed abutment in the axial direction, which is used to define the spatial position of the mount. It is also possible to provide more than one mount. The fixing element and/or mounting in the radial direction make it possible for the light guiding rod to be resiliently mounted in the axial direction and/or in the radial direction.

The protection optical unit preferably comprises or consists of a window element. The window element has two sides, one side facing the light guiding rod or the interior of the housing and an opposite side facing the protection region to be monitored. The window element is particularly preferably transmissive to electromagnetic radiation at least in the wavelength range from 0.2 micrometers to 6 micrometers.

A tolerance ring is preferably freely mounted between the protection optical unit and the housing or light guiding rod.

The housing preferably has cooling elements, in particular cooling fins, on its outside in the axial direction.

The cooling elements arranged on the outside improve the dissipation of heat from the housing and thus enable the length of the light guiding arrangement, in particular also of the light guiding rod, to be as short as possible.

The light guiding rod preferably comprises or consists of sapphire, and/or the housing comprises or consists of stainless steel.

Sapphire enables particularly good light guiding properties over a wide wavelength range, and so the use of sapphire in the light guiding arrangement is particularly advantageous. Stainless steel, on the other hand, exhibits good temperature resistance, with the result that it can also be used in challenging, in particular very hot, environments. Other suitable materials are of course also capable of being used in other applications.

A receptacle for receiving at least part of a sensor head is preferably formed in the region of the light exit opening. The sensor head can accordingly be coupled to the light guiding rod and thereby direct the light, for example to a sensor. For this purpose, the sensor head to be received in the receptacle particularly preferably has, on an end face arranged at the light guiding rod in the position in which it is received in the receptacle, at least one sensor.

The coupling between the sensor head and the receptacle is particularly preferably reversible, which means that the light guiding arrangement or the sensor head can be exchanged if necessary. The combination of sensor head and light guiding arrangement can accordingly form a spark and/or flame alarm.

Alternatively or additionally, one or more sensors, for example for the detection of electromagnetic radiation that has been guided through the light guiding rod, can be mounted directly at the light guiding rod on the side of the light exit opening.

The light guiding arrangement is preferably designed for coupling optical radiation and an electronic and/or sensor system.

The optical radiation is consequently detected by the sensors and must therefore be coupled via the light guide. Preferably, however, the negative environmental influences, such as temperature and also electromagnetic interference radiation, are decoupled.

Decoupling is preferably used to denote the spatial distance and thermal decoupling of the location at which the characteristic radiation is generated from the location at which the generated radiation is detected. In particular, the decoupling is not a complete decoupling, but rather a sufficient reduction in the mutual influence such that the function of the sensor system detecting the radiation is not impaired by the environment of the monitoring region.

The light guiding arrangement is preferably embodied for use in regions with challenging environmental influences, in particular with at least one of high temperatures, high voltages, strong electromagnetic interference radiation and radioactivity, aggressive atmospheres such as acids and bases, confined spaces, and explosive atmospheres.

In regions of this type that exhibit challenging environmental influences, it is particularly advantageous that the light guiding arrangement enables the radiation that is generated to be decoupled from the detection of the radiation. As a result of the separation or decoupling, the sensor can be protected against the environmental influences and can operate reliably without the need for a complicated configuration of the sensor.

The light guiding arrangement is preferably embodied for guiding light in the wavelength range from 0.2 to 6 micrometers, in particular approximately 2.4 micrometers, and preferably for detecting sparks and/or flames.

The region of spark and/or flame detection is sensitive because, especially with the detection of sparks, a developing fire can be detected so early that the effects can be minimized.

According to the invention, a spark and/or flame detector is furthermore proposed, in particular for use with fire alarm and/or extinguishing control centers, having a light guiding arrangement according to the invention and a sensor head, wherein the sensor head is set up for being coupled to the light exit opening of the light guiding arrangement.

For this purpose, the sensor head is preferably embodied to be received in the receptacle of the housing of the light guiding arrangement; alternatively, a suitable receptacle for receiving the light guiding arrangement can also be designed on the side of the sensor head.

The sensor head preferably has different sensor systems depending on the area of application, which in the assembled state, in which the sensor head is coupled to the receptacle and thus to the light guiding arrangement, are arranged at the light guiding rod in such a way that the transmission of electromagnetic radiation is possible. In this case, direct contact is just as possible as a distance therebetween, provided the coupling of the electromagnetic radiation from the light exit opening to the sensor system is ensured.

The sensor head is therefore preferably embodied to detect radiation characteristic of sparks or flames that emerges from the light exit opening.

The spark and/or flame detector according to the invention can preferably be combined with any of the embodiments described as preferred with respect to the light guiding arrangement.

According to the invention, a fire protection system is furthermore proposed, comprising a spark and/or flame detector according to the invention and an evaluation unit. The evaluation unit is particularly preferably implemented as part of a fire alarm and/or extinguishing control center.

Alternatively, dedicated evaluation units and/or evaluation units integrated into the spark and/or flame detector are also conceivable. In these cases, the evaluation units are preferably set up to evaluate the signals of the sensor and to pass them on to a higher-level unit, for example a control unit of a control center.

A connection cable is preferably provided to connect the spark and/or flame detector to the evaluation unit. Alternatively, the connection and signal transmission can also be wireless.

In an advantageous embodiment of the fire protection system, the latter furthermore has a unit that dispenses extinguishing agent and/or a protection apparatus, wherein this device that dispenses extinguishing agent is controlled by the evaluation unit and/or a central control unit.

The protection apparatus can be any apparatus that is controlled if sparks or flames are detected in order to limit the impact of the damage. Examples of protection apparatuses are material dispensing flaps or power cut-off apparatuses.

In a preferred configuration, the fire protection system is designed as a spark extinguishing system, and the evaluation unit and/or a central control unit is embodied as part of a spark alarm control center.

In a further aspect, a method for the thermal decoupling of at least one sensor of a spark and/or flame detector from the detection location of the electromagnetic radiation characteristic of sparks or flames is proposed. The method comprises the steps of: a) providing a light guiding arrangement for transmitting electromagnetic radiation, in particular ultraviolet and/or infrared radiation, wherein the light guiding arrangement has a housing and a light guiding rod, wherein the housing has a light entrance opening and an opposite light exit opening, wherein the light guiding rod is arranged in the housing between the light entrance opening and the light exit opening, b) guiding electromagnetic radiation by means of the light guiding rod from the light entrance opening to the light exit opening, c) detecting the electromagnetic radiation using the at least one sensor after the electromagnetic radiation has emerged from the light exit opening.

The method according to the invention can be combined analogously with all preferred configurations, in particular the described light guiding arrangement.

An air gap is preferably formed between the light guiding rod and the housing, in particular in the axial direction of the light guiding rod, wherein the air gap is preferably between 0.2 mm and 5 mm, wherein the method includes the following step: d) influencing the air in the air gap, in particular by means of an air inlet device.

By influencing the air in the air gap, in particular the temperature difference between the light entrance opening and the light exit opening can be increased by dissipating heat.

BRIEF DESCRIPTION OF THE DRAWINGS

Further advantages and special configurations will be described below with reference to the accompanying figures. In the figures.

MODE(S) FOR CARRYING OUT THE INVENTION

Figure 1:
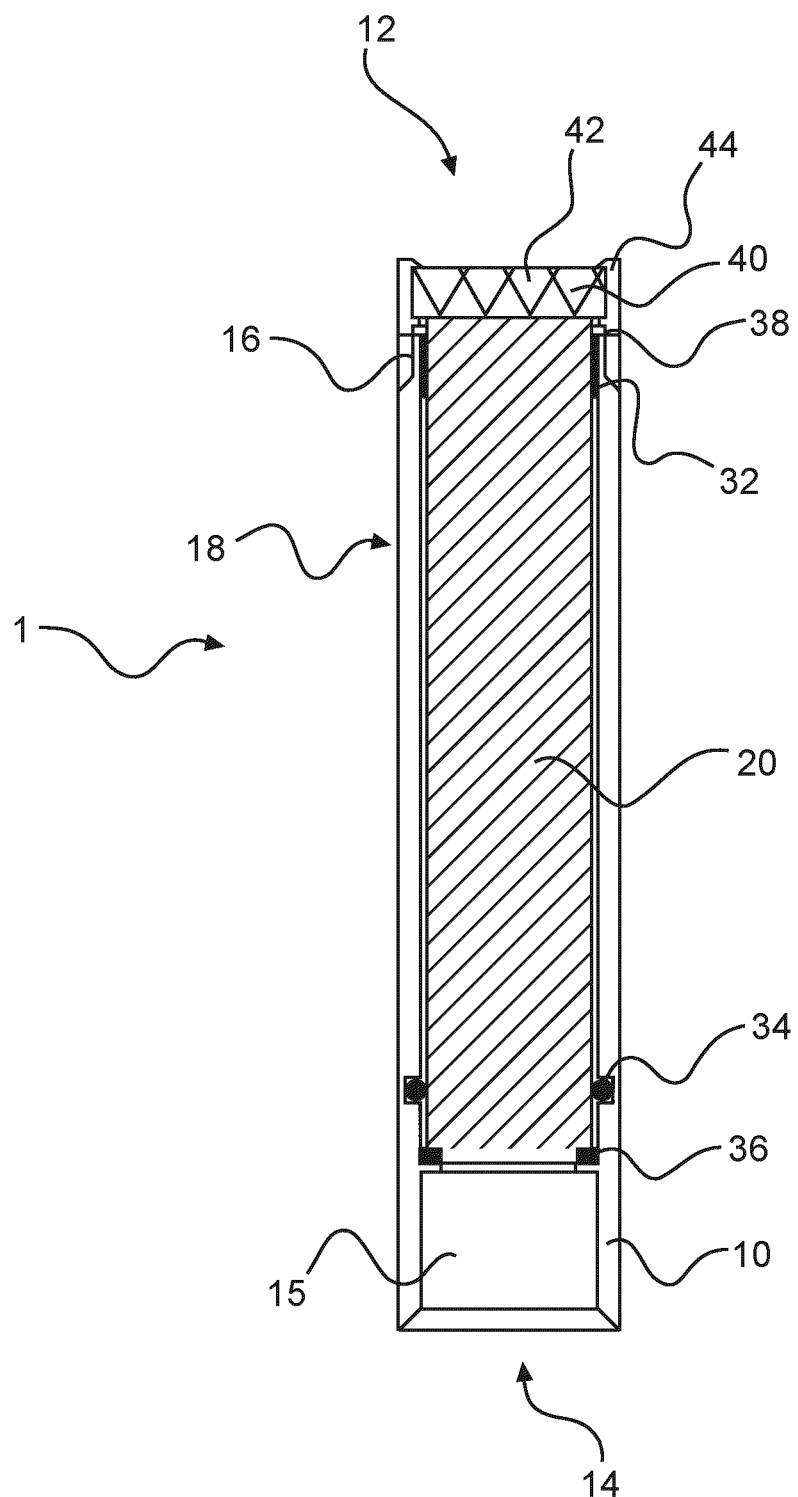
FIG. 1 shows, schematically and by way of example, a light guiding arrangement in cross section.

FIG. 1 shows, schematically and by way of example, a light guiding arrangement 1 in cross section. The light guiding arrangement 1 is set up to guide light, in particular ultraviolet, infrared, and/or temperature radiation, from a light entrance opening 12 to a light exit opening 14.

The light guiding arrangement 1 comprises a housing 10, in the interior of which a light guiding rod 20 is resiliently mounted. To mount the light guiding rod 20, the light guiding arrangement 1 has a spring element 32, a spring element 34, and a spring element 36. It should be noted here that the spring elements 32, 34, 36 shown by way of example can also be embodied differently, for example only a single spring element may be provided.

The spring elements 32, 34 and 36 allow the light guiding rod 20 to expand relative to the housing 10 without stresses occurring. In addition, the usually highly sensitive light guide of the light guiding rod 20 is protected by its mounting. It is known that different materials, in the present case for example the light guiding rod 20 and the housing 10, expand to different extents when heated, which can lead to stresses. This effect can be compensated for by the resilient mounting.

An air gap of 0.2 mm to 5 mm is preferably provided between the light guiding rod 20 and the housing 10. Air, in particular compressed air, can be introduced into the air gap by means of an air introduction device (not shown). The compressed air improves cooling of the light guiding rod 20 or the light guiding arrangement 1.

The spring element 32 is arranged in the region of the light entrance opening 12 and is held in position for example by means of a tolerance ring 38. The tolerance ring 38 is in turn fastened via a fixing device, for example a thread 16 with which a protection optical unit 40 is fixed. The protection optical unit 40 has a window element 42, which is optically transparent to corresponding wavelengths and is embodied, for example, in the form of a lens or disk.

The protection optical unit 40 can accordingly be mounted reversibly, in particular be able to be unscrewed, and can thus be easily changed in the event of contamination or damage. In this example, the window element 42 is held with a beading 44 of the protection optical unit 40.

The light guiding arrangement 1 according to the invention makes the detection of infrared radiation in an application range of up to 450° C., for example, possible, wherein cooling to a maximum operating temperature of a sensor head accommodated in the receptacle 15 is achieved over the course of the light guiding arrangement 1 in the axial direction.

In the example in which the sensor is a silicon element that can withstand a temperature of at most 100° C., cooling from 450° C. by $\Delta T$, equal to 350 K, takes place. The length of the light guiding rod 20 is the result of the cooling required, which means that shorter light guiding rods 20 are possible for lower temperature differences to be achieved.

The thermal conductivity of the light guiding rod 20 and of the enclosing housing 10 also have an influence on the minimum length. The lower the thermal conductivity is, the shorter can be the light guiding rod 20. The cooling of the light guiding rod 20 by the housing 10, in particular by cooling elements 18 arranged on the surface, and also the ambient conditions, such as still air, moving air, and the temperature within this surrounding area, are also determined.

The following table gives some examples of suitable materials for light guides as light guiding rod 20, as housing 10 or as sensor and their ranges of application. Of course, other materials suitable as light guides, housings, and sensors are also possible:

| Material | Use | Thermal conductivity (W/(m*K)) | Expansion coefficient | Wavelength range (transmission >50%) (nm) | Operating temperature range (° C.) |
|---|---|---|---|---|---|
| Sapphire | Light guide | 40 @ 25° C. 12 @ 400° C. | $5.6*10^{-6}$/K. | 300 . . . 5500 | >1000 |
| Borosilicate glass | Light guide | 1.2 | $3.3*10^{-6}$/K. | 350 . . . 2500 | 500 |
| Quartz glass | Light guide | 1.38 | $0.54*10^{-6}$/K. | 170 . . . 3500 | 1000 |
| Stainless steel | Housing | 16 | $16*10^{-6}$/K. | — | 450 . . . 850 |
| Titanium | Housing | 22 | $8.6*10^{-6}$/K. | — | 550 |
| Aluminum | Housing | 220 | $23.8*10^{-6}$/K. | — | 250 |
| Brass | Housing | 123 | $21*10^{-6}$/K. | — | 250 |
| Silicon element | Detector | — | — | 220 . . . 1100 | −40 . . . 100 |
| PbS | Detector | — | — | 1000 . . . 3000 | −40 . . . 65 |
| PbSe | Detector | — | — | 1000 . . . 4700 | −40 . . . 85 |
| InGaAs | Detector | — | — | 900 . . . 1700 | −40 . . . 85 |
| Pyrodetector | Detector | — | — | 200 . . . 25000 | −40 . . . 85 |
| UV sensor | Detector | — | — | 180 . . . 280 | −40 . . . 125 |

The spring element 34 is received in a groove, for example, so that it makes resilient mounting of the light guiding rod 20 in the radial direction possible. The position of the spring element 34 in the axial direction along the light guiding rod 20 is fixed by means of the groove. Finally, the spring element 36 is arranged on the side of the light exit opening 14 and preferably resiliently mounts the light guiding rod 20 in the axial direction.

On the side of the light exit opening 14, there is a receptacle 15 for receiving a sensor head, in particular for reversibly receiving a sensor head, for example a flame and/or spark detector, as will be described in detail later with reference to FIGS. 2 to 4. In conjunction with a sensor head, the light guiding arrangement 1 forms a spark and/or flame detector.

One or more cooling elements 18 is or are preferably arranged on the outside of the housing 10. The cooling elements 18 improve heat dissipation from the housing 10.

Materials with a low thermal conductivity are better suited for thermal decoupling. For example, sapphire is suitable as the material of the light guiding rod 20 only for a temperature difference $\Delta T$ of approx. 200 K with a length of 10 cm and a diameter of 20 mm. Here, a stainless steel case as the housing 10 and still air is assumed. For high temperature applications up to a temperature difference $\Delta T$ of 350 K, borosilicate glass or quartz glass is preferably used.

For the decoupling of broadband wavelengths, for example in the case of flame detection with pyrodetectors, sapphire is preferably used as the material of the light guiding rod 20.

The cooling can be improved by the targeted introduction of air, for example a feed of compressed air, into the air gap between the light guiding rod 20 and the housing 10. In this case, cold air is preferably introduced in the vicinity of the receptacle 15, i.e. in the vicinity of the detector, and is discharged in the hot region, i.e. in the region of the light entrance opening 12.

As already mentioned, the light guiding rod 20 is mounted in a floating manner since, were it to come into contact with the housing 10, its refractive index would change at a cylindrical surface of the light guiding rod 20, which is embodied to be cylindrical for example, and thus the light guidance would be impaired. Alternatively, it would be conceivable to render the cylindrical surface reflective, although this requires a more complex implementation. The floating mounting is also necessary to protect the fragile light guiding rod 20.

In a very specific exemplary embodiment, the light guiding rod 20 is between 75 mm and 1500 mm long and has a diameter of 5 mm to 25 mm. Larger diameters, in particular from 10 mm to 25 mm, particularly include the case in which optics monitoring is provided, see FIGS. 2 and 3.

It is known that, for example, in pneumatic conveyors for materials such as flour or chips, foreign particles such as stones can lead to the generation of sparks.

The present invention provides the light guiding arrangement 1, which is utilizable in a spark alarm and/or flame alarm.

Compared with quartz, sapphire as the material of the light guiding rod 20 has a greater transmission, but must be better protected against vibrations. For this purpose, the tolerance rings 38 can be formed, for example, with an accordion-like shape. Spring elements or tolerance rings made of rubber materials are typically not possible due to the high temperatures that occur.

In contrast to known light guiding arrangements, in particular the surface area for sensors that is available in the region of the light exit opening 14 is large enough to accommodate the entire area of the sensor or sensors.

In the light guiding arrangement 1 shown in FIG. 1, the resilient mounting absorbs the different expansions and the impacts.

Figure 2:
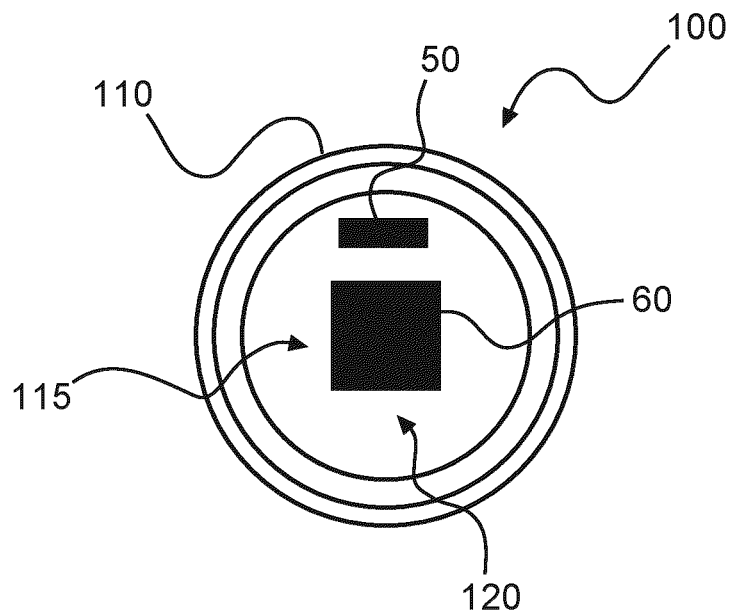
FIG. 2 shows, schematically and by way of example, a top view of a sensor head for spark detection.

FIG. 2 shows, schematically and by way of example, a top view of a sensor head 100, which is embodied to be received in the receptacle 15 shown in FIG. 1. The surface shown is intended to be arranged at the light exit opening 14 in a mounting position, that is to say to be arranged in contact with it or in the vicinity thereof. An insertion region 115 is formed here for arrangement within the receptacle 15.

A first sensor 50 and a second sensor 60 can be seen, which are coupled to the light guiding rod 20 in the mounting position. The first sensor 50 can be, for example, a sensor for optics monitoring, which is arranged to monitor whether visibility through the light guiding rod 20 is ensured.

The second sensor 60 can be the sensor that ultimately detects the spark and/or the flame. It should be noted that the diameter of the light guiding rod 20 may be smaller if the first sensor 50 is dispensed with. The arrangement of both the first sensor 50 and the second sensor 60 improves the reliability of a spark and/or flame detector 2, which is shown in full in FIG. 4.

The sensor head 100 furthermore has an electronic system 120 (not shown in more detail). In the simplest case, the electronic system 120 is not actually an electronic system at all, but merely set up to pass on signals of the sensors 50, 60 to an evaluation electronic system, for example a fire alarm and/or extinguishing control center, cf. FIG. 6. Alternatively, the data or signal processing can also be carried out partially or completely in the sensor head 100.

The embodiment of FIG. 2 is, for example, a sensor head 100 of a spark alarm, since the second sensor 60 is designed as a single sensor for detecting a specific wavelength that is characteristic of sparks.

Figure 3:
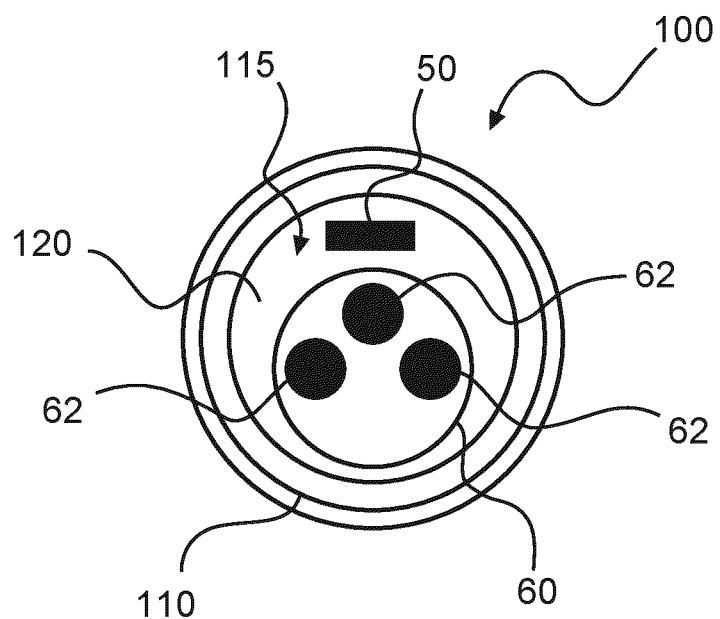
FIG. 3 shows, schematically and by way of example, a top view of a sensor head for flame detection.

FIG. 3 shows, schematically and by way of example, a top view of a further sensor head 100. In this example, the second sensor 60 has three narrowband sensor elements 62, which preferably capture three different wavelengths of the optical radiation. This configuration is preferably designed for a flame alarm.

The sensor head 100 has a housing 110, which comprises means for mounting the sensor head 100 in the receptacle 15. For example, the connection can be made by a form fit, in the form of a bayonet lock, cf. FIG. 5, or by other types of connection.

It should be noted that the sensor head 100 is preferably screwed into the receptacle 15. It is thus possible to design the light guiding arrangement 1 according to the invention both as a spark alarm and as a flame alarm and, in a further embodiment, also as a combined spark and flame alarm. For this purpose, for example a thread can be provided in the receptacle 15 and the housing 110 can have a corresponding thread. Other types of fixation are, of course, also conceivable.

Figure 4:
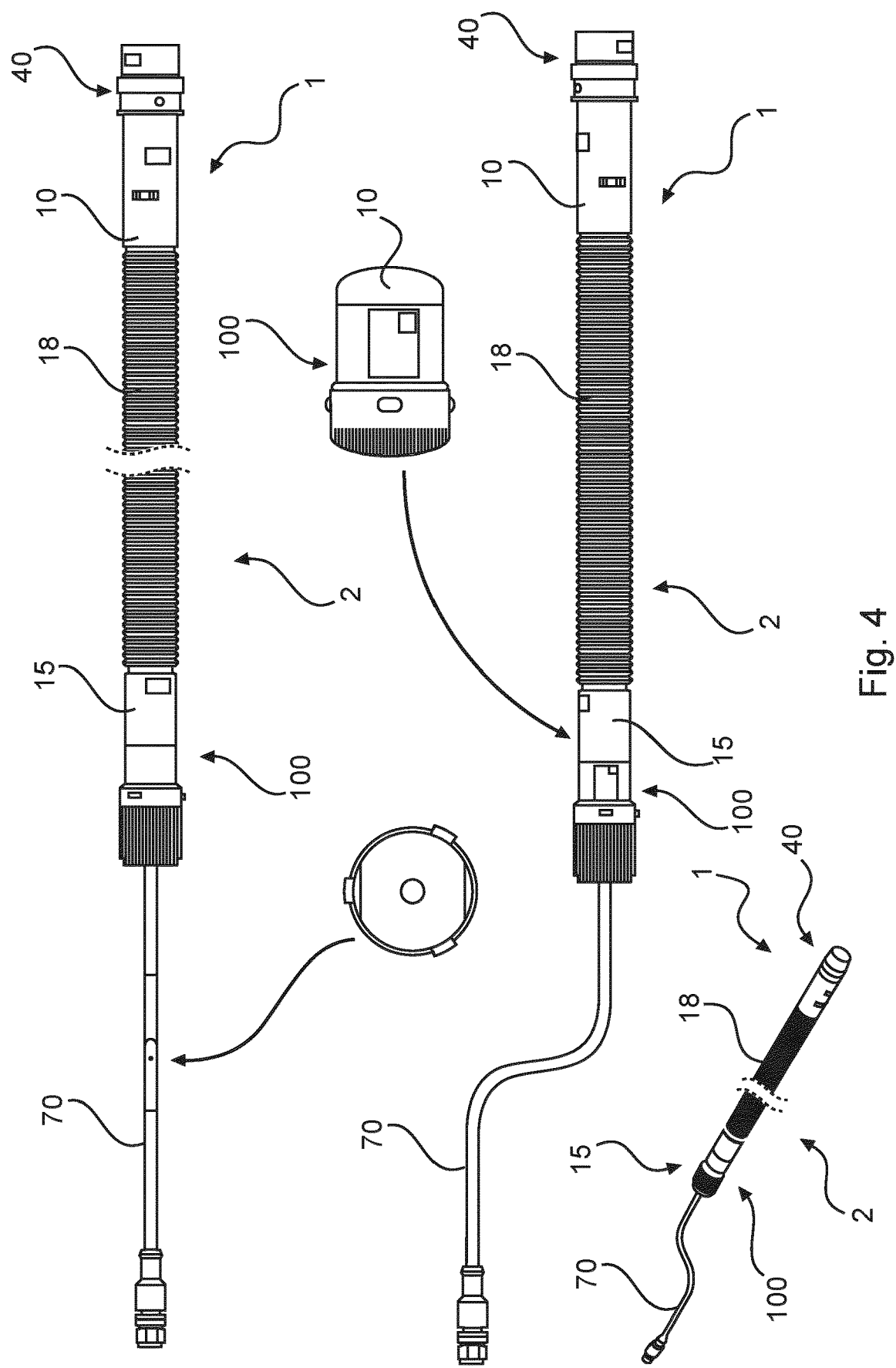
FIG. 4 shows, schematically and by way of example, a spark or flame detector in several views.

FIG. 4 shows, schematically and by way of example, different views of a spark and/or flame detector 2, which has a light guiding arrangement 1 and a sensor head 100 received in the receptacle 15. A connection cable 70, which is designed to be flexible, makes the transmission of data from the sensor head 100 to an evaluation device, in particular a fire alarm and/or extinguishing control center, possible. Cooling fins 18 are shown arranged on the housing 10. The housing 10 is designed to be rigid in order to stabilize the light guiding rod 20.

Figure 5:
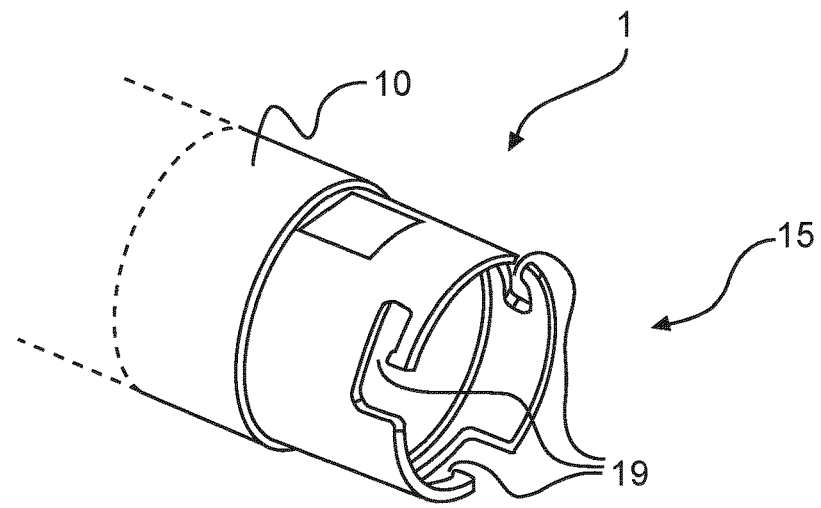
FIG. 5 shows, schematically and by way of example, an embodiment of a housing of the light guiding arrangement.

FIG. 5 shows, schematically and by way of example, part of the housing 10 of a light guiding arrangement 1, specifically the part of the receptacle 15. In the special configuration of FIG. 5, the receptacle 15 has slotted link guides 19 for fastening a sensor head 100, which has corresponding coupling means. Of course, other types of fixation are also possible.

As an alternative to the embodiment of the receptacle 15 as a receptacle, that is to say as a socket, the receptacle 15 can also be designed as a plug, and the corresponding receptacle can be formed on the side of the sensor head 100. Accordingly, the sensor head 100 can also have the suitable coupling means, for example slotted link guides.

Figure 6:
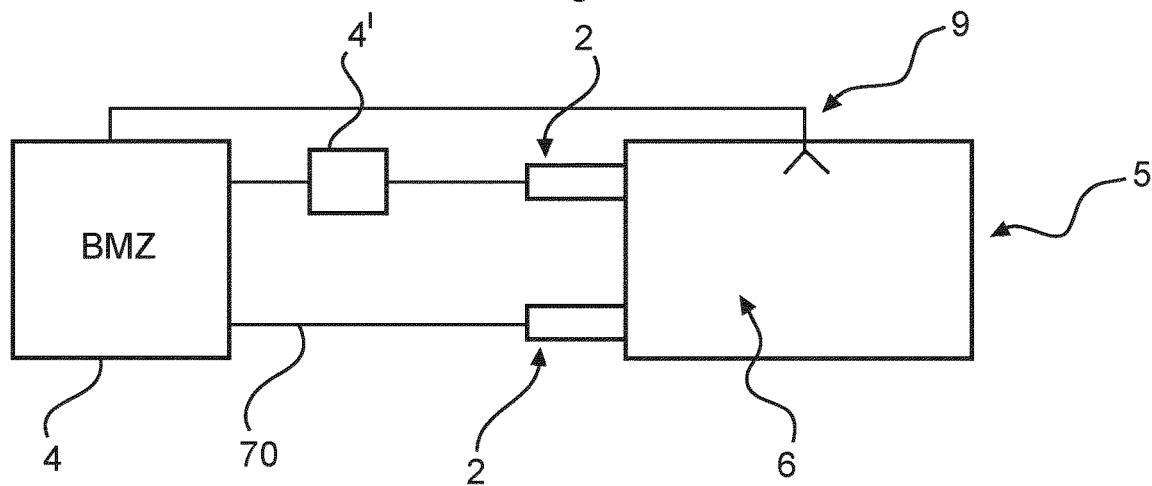
FIG. 6 shows, schematically and by way of example, a fire protection system.

FIG. 6 shows, schematically and by way of example, a fire protection system 5 according to the invention. In this example, the fire protection system 5 has an evaluation unit 4, embodied in the form of a fire alarm and/or extinguishing control center, which is connected to a plurality of spark and/or flame alarms 2 via connecting lines 70. The evaluation unit 4 is in particular the central control unit of the fire protection system 5. As a further example, a separate evaluation unit 4' is shown, which is arranged between the spark and/or flame alarm 2 and the fire alarm and/or extinguishing control center and evaluates and passes on the detection signals of the spark and/or flame alarm 2.

The light entrance opening of, in this example, two spark and/or flame alarms 2 is located in a monitoring region 6, which is, for example, the interior of a material dryer. Furthermore, a device that dispenses extinguishing agent and/or a protection apparatus 9, for example an extinguishing nozzle or another device, is shown. In the configuration as a device that dispenses extinguishing agent, it is designed to dispense extinguishing agent into the monitoring region 6 when controlled accordingly. Examples of protection apparatuses are material dispensing flaps or power cut-off apparatuses. A device that dispenses extinguishing agent can be configured as desired and as is known to a person skilled in the art and can comprise, for example, an extinguishing agent storage container, a triggering device, a pipeline system, and/or an extinguishing nozzle.

Figure 7:
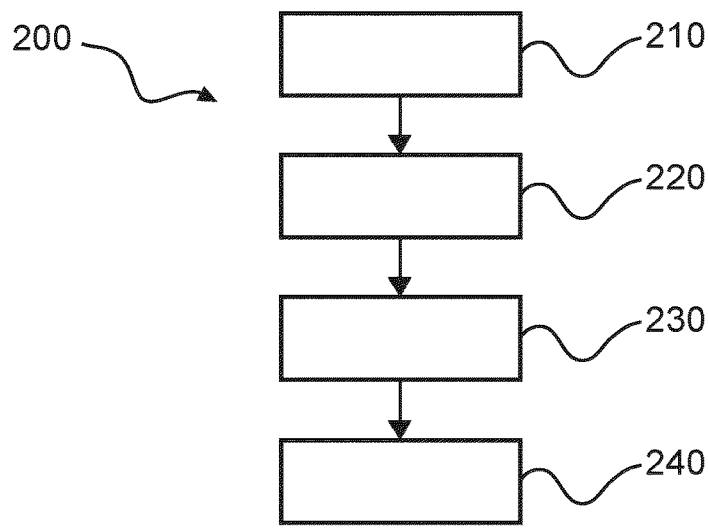
FIG. 7 shows, schematically and by way of example, a flowchart of a method.

FIG. 7 shows, schematically and by way of example, a flowchart of a method 200 for thermal decoupling of at least one sensor 50, 60 of a spark and/or flame detector 2 from the detection location of the electromagnetic radiation that is characteristic of sparks or flames.

In a step 210, a light guiding arrangement 1 for transmitting electromagnetic radiation, in particular ultraviolet and/or infrared radiation, is provided. The light guiding arrangement 1 has a housing 10 and a light guiding rod 20. The housing 10 has a light entrance opening 12 and an opposite light exit opening 14. The light guiding rod 20 is arranged in the housing 10 between the light entrance opening 12 and the light exit opening 14.

In a step 220, electromagnetic radiation is guided from the light entrance opening 12 to the light exit opening 14 by means of the light guiding rod 20.

In a step 230, the electromagnetic radiation is detected by the at least one sensor 50, 60 after the electromagnetic radiation has emerged from the light exit opening 14.

Finally, in an optional step 240, the air in an air gap between the light guiding rod 20 and the housing 10 is influenced in particular by means of an air introduction device (not shown).

LIST OF UTILIZED REFERENCE SIGNS

1 Light guiding arrangement
2 Spark and/or flame detector
4 Central control unit
4' Evaluation unit
5 Fire protection system
6 Monitoring region
9 Device that dispenses extinguishing agent and/or protection apparatus
10 Housing
12 Light entrance opening
14 Light exit opening
15 Receptacle
16 Thread
18 Cooling elements
19 Slotted link guides
20 Light guiding rod
32 Spring element
34 Spring element
36 Spring element
38 Tolerance ring
40 Protection optical unit
42 Window element
44 Fixing element
50 First sensor
60 Second sensor
62 Sensor element
70 Connection cable
100 Sensor head
110 Housing
115 Insertion region
120 Electronic system
200 Method
210 Provision step
220 Guiding step
230 Detection step
240 Influencing step

The invention claimed is:

1. A light guiding arrangement for transmitting electromagnetic radiation, the light guiding arrangement comprising:
  a housing and a light guiding rod,
    wherein the housing has a light entrance opening and an opposite light exit opening,
    wherein the light guiding rod is arranged in the housing between the light entrance opening and the light exit opening,
    wherein the light guiding rod is resiliently mounted on at least one side in the housing with a spring-loaded mounting,
    wherein the housing includes an internal surface between the light guiding rod and the light exit opening, and
    wherein the internal surface supports the spring-loaded mounting.

2. The light guiding arrangement as claimed in claim 1, wherein the internal surface that supports the spring-loaded mounting comprises a cantilever mounting surface that extends transverse to a longitudinal axis of the housing to support the spring-loaded mounting, and wherein the spring-loaded mounting engages at least a terminal portion of the light guiding rod that extends transverse to an axial direction of the light guiding rod.

3. The light guiding arrangement according to claim 2, wherein an air gap is formed between the light guiding rod and the housing in the axial direction of the light guiding rod, wherein the air gap is between 0.2 mm and 5 mm.

4. The light guiding arrangement as claimed in claim 3, further comprising a protection optical unit arranged in front of the light guiding rod at the light entrance opening.

5. The light guiding arrangement as claimed in claim 4, wherein the housing has a thread in a region of the light entrance opening, and the protection optical unit is embodied to be screwed onto the housing, and wherein, in the region of the light entrance opening, a fixing element for the protection optical unit is formed in the form of beading.

6. The light guiding arrangement as claimed in claim 5, wherein a tolerance ring is mounted in a floating manner between the protection optical unit and the housing or light guiding rod.

7. The light guiding arrangement as claimed in claim 2, wherein the light guiding arrangement has an elastic mounting in a radial direction around the light guiding rod and wherein the elastic mounting comprises an additional spring-loaded mounting in an internal groove in the housing.

8. The light guiding arrangement according to claim 2, wherein the light guiding arrangement has an air gap, that radially surrounds the light guiding rod, between the light guiding rod and the housing, wherein the light guiding arrangement has an air inlet device, which is set up to introduce air into the air gap between the light guiding rod and the housing.

9. The light guiding arrangement as claimed in claim 1, wherein the housing has cooling fins, on its outside in an axial direction of the housing.

10. The light guiding arrangement as claimed in claim 1, wherein the light guiding rod consists of sapphire and/or the housing consists of stainless steel.

11. The light guiding arrangement as claimed in claim 1, wherein a receptacle for receiving a sensor head of a flame and/or spark detector is formed in a region of the light exit opening.

12. The light guiding arrangement as claimed in claim 1, wherein the light guiding arrangement is embodied for coupling optical radiation and an electronic or sensor system.

13. The light guiding arrangement as claimed in claim 12, wherein the light guiding arrangement is embodied for use in regions with challenging environmental influences including at least one of high temperatures, high voltages, strong electromagnetic interference radiation and radioactivity, aggressive atmospheres including acids and bases, confined spaces, and explosive atmospheres.

14. The light guiding arrangement as claimed in claim 1, wherein the light guiding arrangement is embodied for guiding light in a wavelength range from 0.2 to 6 micrometers.

15. A spark and/or flame detector for use with fire alarm and/or extinguishing control centers, comprising:
    a light guiding arrangement as claimed in claim 1, and
    a sensor head,
        wherein the sensor head is set up for being coupled to the light exit opening of the light guiding arrangement.

16. A fire protection system for detecting sparks and/or flames, comprising:
    a spark and/or flame detector as claimed in claim 15, and
    an evaluation unit.

17. The fire protection system as claimed in claim 16, further having a unit that dispenses extinguishing agent and/or a protection apparatus, wherein the unit that dispenses extinguishing agent is controlled by the evaluation unit and/or a central control unit.

18. The fire protection system as claimed in claim 16, wherein the fire protection system is designed as a spark extinguishing system, and the evaluation unit and/or a central control unit is embodied as part of a spark alarm center.

19. A light guiding arrangement for transmitting electromagnetic radiation, the light guiding arrangement comprising:
    a housing and a light guiding rod,
    wherein the housing has a light entrance opening and an opposite light exit opening,
    wherein the light guiding rod is arranged in the housing between the light entrance opening and the light exit opening, and
    wherein the light guiding rod is resiliently mounted in the housing on a radial side of the light guiding rod with a first spring-loaded mounting and an axial side of the light guiding rod with a second spring-loaded mounting.

* * * * *